(12) United States Patent
Sorric et al.

(10) Patent No.: US 7,607,491 B2
(45) Date of Patent: Oct. 27, 2009

(54) JACKHAMMER LIFT ASSIST

(75) Inventors: Ronald Jon Sorric, Warner Springs, CA (US); Ronald William Sorric, Warner Springs, CA (US)

(73) Assignee: Integrated Tool Solutions LLC, San Jacinto, CA (US)

( * ) Notice: Subject to any disclaimer, the term of this patent is extended or adjusted under 35 U.S.C. 154(b) by 2 days.

(21) Appl. No.: 11/376,359

(22) Filed: Mar. 15, 2006

(65) Prior Publication Data

US 2007/0215368 A1  Sep. 20, 2007

(51) Int. Cl.
*B27C 3/08* (2006.01)
(52) U.S. Cl. .............................. 173/90; 173/31; 173/32; 173/171; 173/186; 173/19; 173/169; 173/170
(58) Field of Classification Search .................. 173/31, 173/32, 170, 90, 171, 186, 19, 169
See application file for complete search history.

(56) References Cited

U.S. PATENT DOCUMENTS

| | | | |
|---|---|---|---|
| 1,202,551 A | 10/1916 | MacKenzie | |
| 2,622,562 A | 12/1952 | Longenecker | |
| 2,776,653 A | 1/1957 | Eaton et al. | |
| 2,874,933 A | 2/1959 | Feucht | |
| 4,548,279 A | 10/1985 | Zaruba | |
| 4,986,370 A | 1/1991 | Johnson | |
| 5,095,600 A * | 3/1992 | Allan | 29/81.16 |
| 6,050,345 A | 4/2000 | Jarvinen et al. | |
| 6,354,080 B1 * | 3/2002 | Decker | 60/412 |
| 2007/0240890 A1 * | 10/2007 | Sorric et al. | 173/31 |

* cited by examiner

*Primary Examiner*—Rinaldi I. Rada
*Assistant Examiner*—Michelle Lopez
(74) *Attorney, Agent, or Firm*—Laurie A. Axford; The Nath Law Group

(57) ABSTRACT

The present invention relates to a lift assist device which is used to alleviate the physical demands for the operation of a heavy percussion power tool, such as a pneumatic jackhammer, by facilitating lifting and freeing the percussion power tool. In general, the lift assist device contains an actuating cylinder with a lifting foot attached to the outside end of its piston rod and a control unit which comprises a directional control valve and a hand lever. The control unit is on the top of the lift assist device and can be used to control the lifting speed and height. The lift assist device is secured to the body of the percussion power tool with one or more mounting elements.

18 Claims, 12 Drawing Sheets

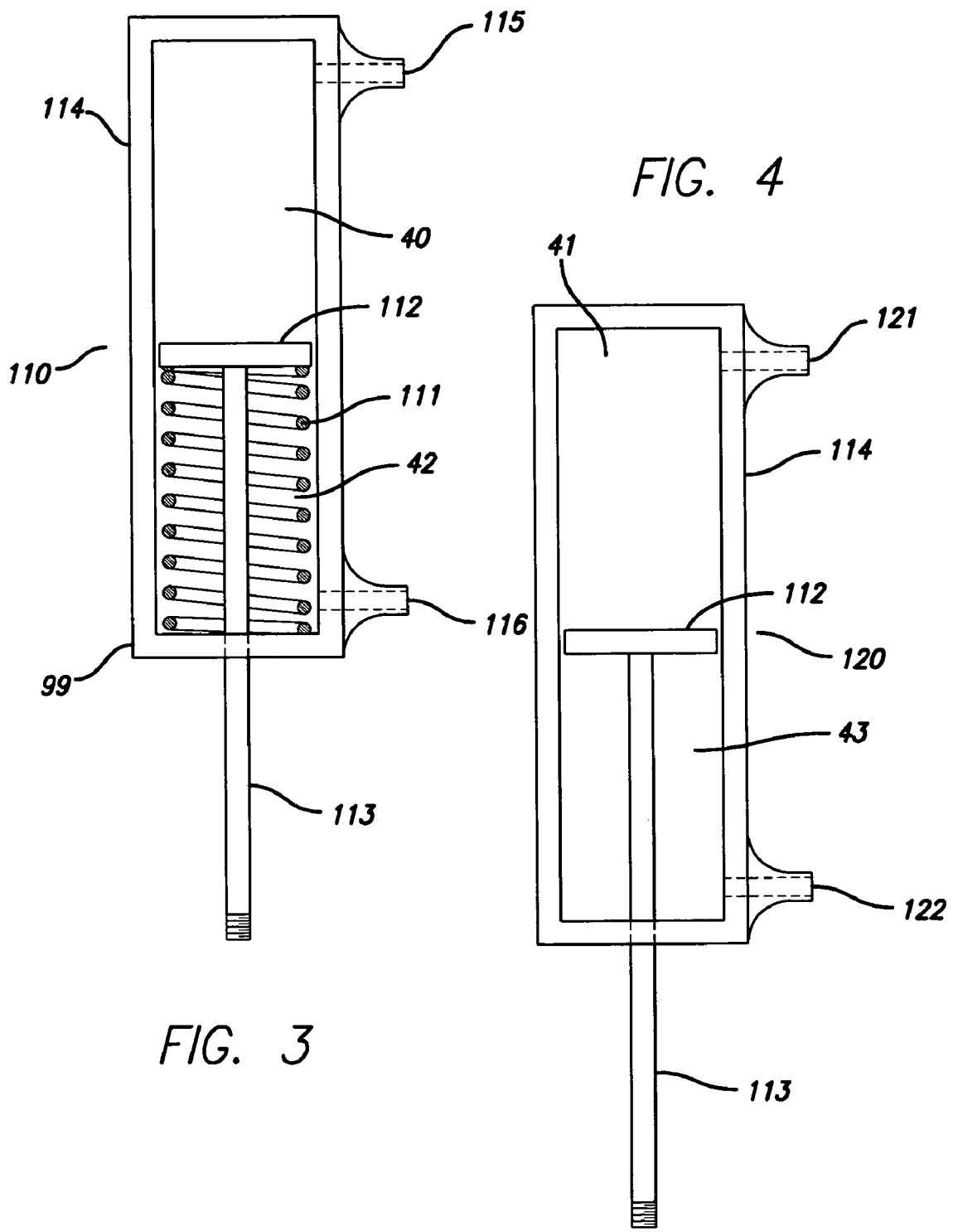

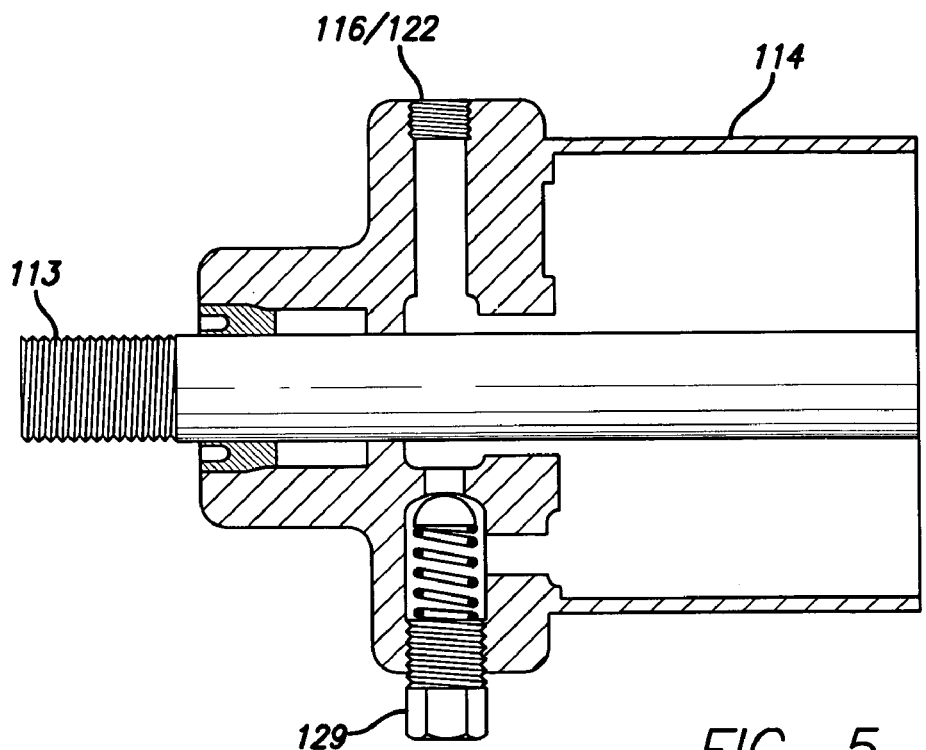
FIG. 5
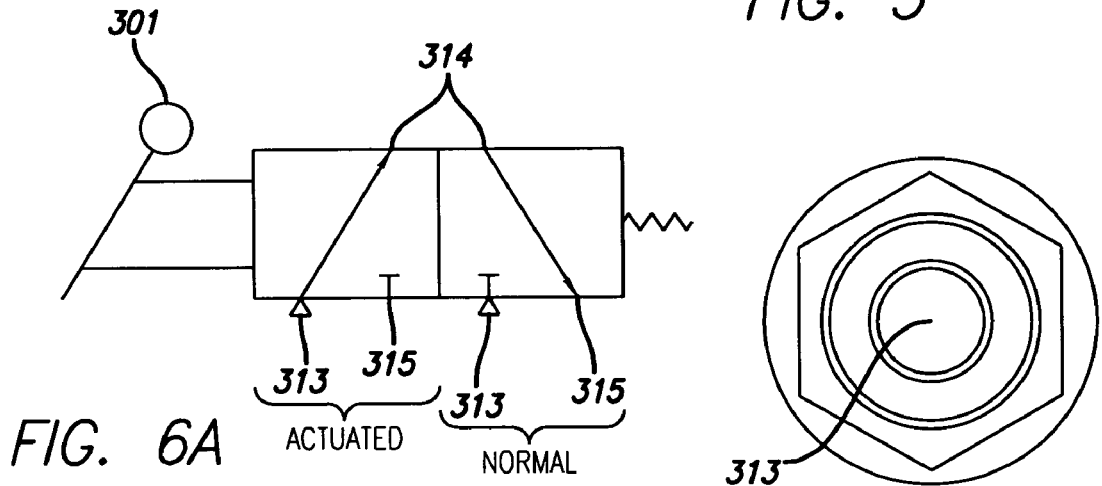
FIG. 6A
FIG. 6C
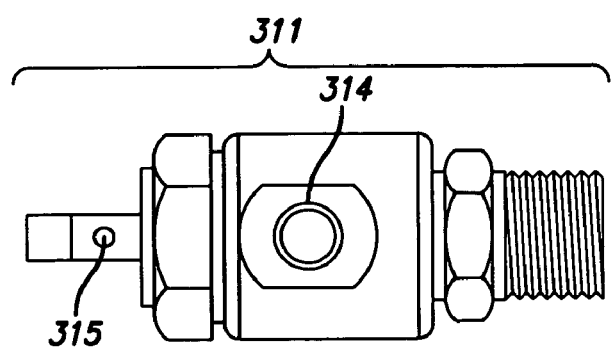
FIG. 6B

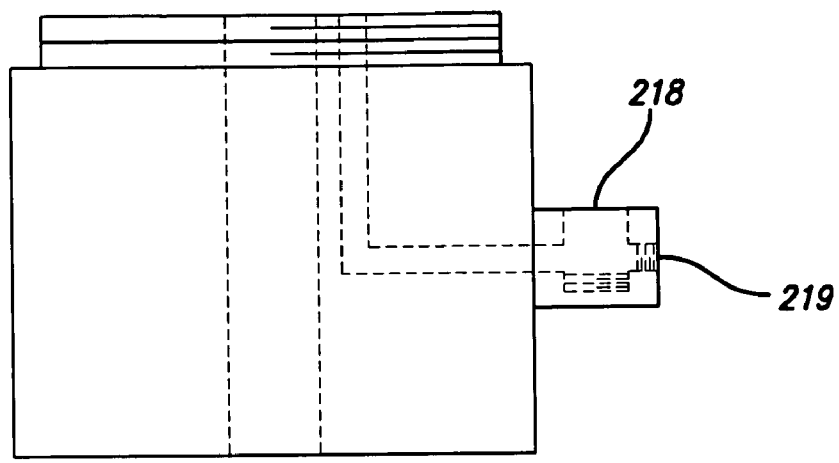
FIG. 13
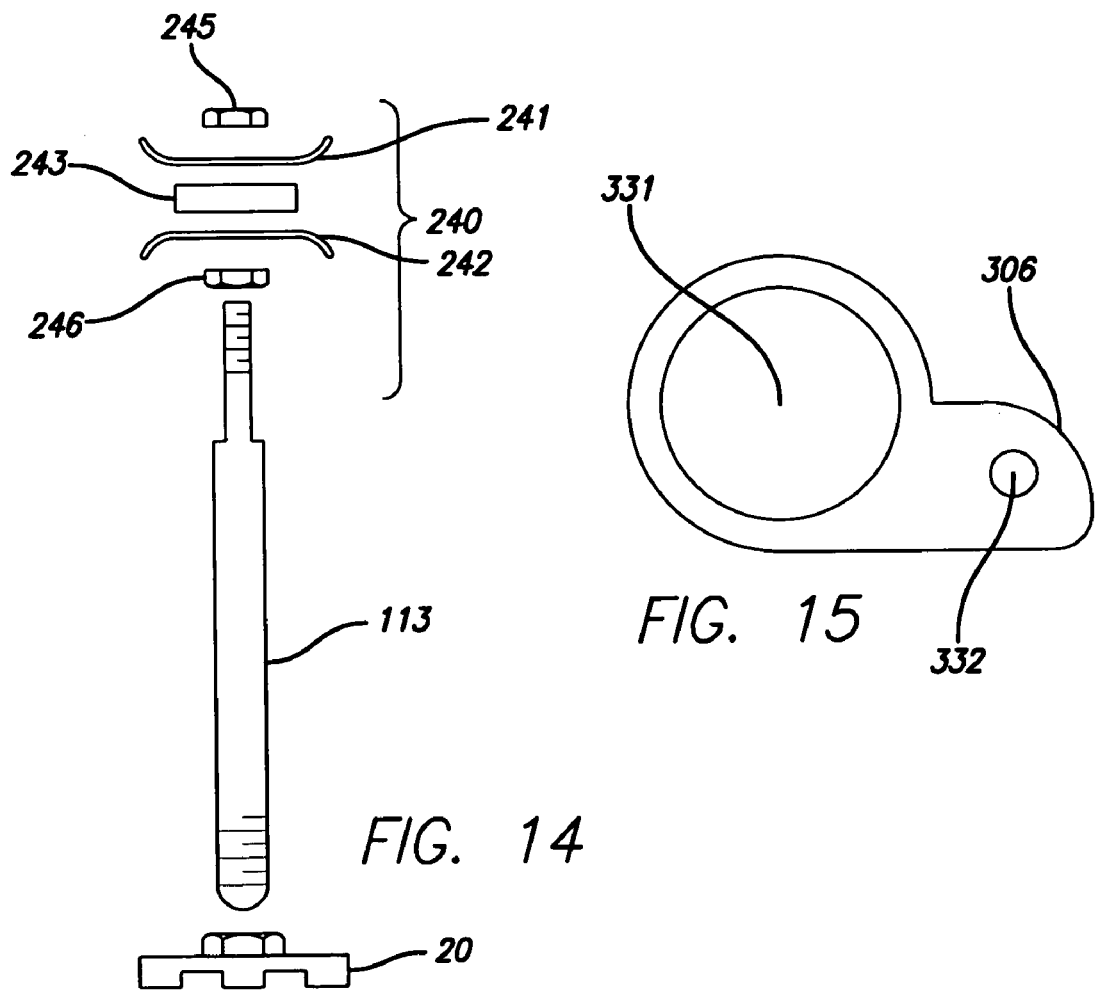
FIG. 14
FIG. 15

US 7,607,491 B2

JACKHAMMER LIFT ASSIST

TECHNICAL FIELD

The present invention relates to a lift assist device which is used to alleviate the physical demands for the operation of a heavy percussion power tool by facilitating lifting and freeing the percussion power tool from the working surface.

BACKGROUND OF THE INVENTION

A portable percussion power tool such as a pneumatic jackhammer employs a linearly reciprocating piston-driven anvil which rapidly and repeatedly hammers on the end of the chisel bit and impels it into a working surface. Its effectiveness relies on the inertia of the mass of its body and gravity is also required to bring the mass back into contact with the working surface after each blow. As such, the percussion power tool tends to be very heavy, typically having a weight of from about 60 to 100 pounds. During a routine operation, an operator is required to repetitively lift and reposition the heavy device for next operation. When working with a tool of such weights, the operator has to endure a great physical stress and is thus prevented from being able to operate the hammer for an extended period of time. Furthermore, the chisel bit is also often jammed into the material being worked and requires a great deal of effort to remove, which makes the operation even more physically demanding. As a consequence, it greatly reduces the productivity but also poses a great health risk to its operators.

Several different types of lift assist devices have been developed to reduce these physical demands by facilitating the lifting and the extracting of the equipment. U.S. Pat. No. 2,622,562 to Longenecker discloses a detachable lift assist device for a percussion power tool, such as a pavement breaker. The lift assist device is a fluid actuated lifting jack which is controlled by a throttle valve with an operating lever adjacent to one of the hand grips of the percussion power tool. When the throttle valve is engaged, the actuating media is admitted into the jack and provides forces to lift the percussion power tool. When the throttle valve is disengaged, the actuating media pressure is released, but the piston of the jack remains in contact with the working surface. There is no retracting mechanism provided for the piston in the disclosure. However, the piston can be manually pushed back to a retracted position.

U.S. Pat. No. 2,776,653 to Eaton discloses an improvement in a pneumatic drill by attaching a pair of pneumatic lifting jacks with a substantially semicircular foot to engage with the working surface for lifting the pneumatic drill. A mechanism is also provided for retracting the lifting foot upon the return of the pneumatic drill to the working position.

U.S. Pat. No. 4,548,279 to Zaruba discloses a demolition tool with an extractor for freeing the jammed demolition tool. The extractor has a pneumatic cylinder with a lifting foot. There is no retracting mechanism provided for the piston in the disclosure. The lifting foot is constantly in contact with the working surface. A flow control valve is provided to regulate the lifting speed.

U.S. Pat. No. 4,986,370 to Johnson discloses a pneumatic lift attachment for a pneumatic jackhammer for applying an upward force to the jackhammer. The lift attachment is a cylinder with a lift foot. The body of the cylinder is enclosed within a support housing which has a lift plate with a guide hole and an adjustable chain for securing a pneumatic hammer to the lift plate. Once engaged, the lifting foot is in constant contact with the working surface.

U.S. Pat. No. 6,050,345 to Jarvinen et al. discloses an ergonomic tool which includes a jackhammer and a lift assist mechanism. The lift assist mechanism contains a slidable frame with a lifting foot attached to the lower end and a piston attached to the upper end. The piston is directly connected to the upper body of the jackhammer and not movable. The frame which contains a rodless cylinder moves and provides a lifting force to raise the jackhammer.

More than a year ago, the present inventors disclosed a prototype of a lift assist device for a percussion power tool, such as a pneumatic jackhammer. As seen in FIG. 1, the lift assist device contains a double acting cylinder with a lifting foot and a commercial four-way directional control valve with five ports. The actuating cylinder and the directional control valve are from commercial sources and supplied as two separate parts. The direction control valve is mounted to the top end of the cylinder using a mounting bracket and the foot is mounted to the bottom end of the cylinder. The lift assist device is then secured to the upper body of the jackhammer using the same mounting bracket. By using a double acting cylinder, the lifting foot can be retracted by redirecting the flow of the compressed air from the upper chamber to the lower chamber to prevent damages to the lift assist device when the percussion power tool is in operation. One significant limitation of this prototype is that the lift assist device is heavy with an overall weight of over 20 pounds, which adds additional unnecessary physical burdens to the operator.

However, these previous lift assist devices have some disadvantages. Percussion power tools are commercially supplied in various lengths and configurations. Using these existing designs, each model of percussion power tools will require a specific design to fit to their particular length and configuration. Accordingly, it is an object of the present invention to provide a single lift assist device which can be used readily with various percussion power tools of different heights and configurations. The lift assist device of the present invention contains a pressure regulator which is used to adjust the lifting height required for particular equipment.

SUMMARY OF THE INVENTION

In accordance with the present invention, a lift assist device is provided for use with a conventional percussion power tool, such as a pneumatic jackhammer, to reduce the physical demands for its operation by facilitating the lifting and the extracting of the equipment. In general, the lift assist device contains an actuating cylinder with a lifting foot attached to the outside end of its piston rod and a control unit which comprises a directional control valve and a hand lever. The control unit is on the top of the lift assist device whereas the lifting foot is on the bottom to engage with the working surface. The directional control valve is operated using the hand lever, preferably adjacent to one of the handles of the percussion power tool to simplify its operation. The lift assist device is secured to the body of the percussion power tool with two mounting elements, preferably one close to the top of the lift assist device and the upper body of the percussion power tool and the other close to the bottom of the lift assist device and the lower body of the percussion power tool.

In one embodiment, the actuating cylinder is a single acting cylinder with a retracting device such as a bias spring, in which the lower retracting chamber is on the same side as where the retracting device is located and the upper lifting chamber is on the opposite side of a piston. Preferably, the control valve is a three-way directional control valve. When pressurized actuating media such as compressed air is admitted to the lifting chamber of the cylinder, the piston with the piston rod moves downward against the working surface, thus generating an upward force to raise and free the percussion power tool. During the lifting process, the spring is compressed. Once the directional control valve is switched to the off position, the pressurized actuating media is released from the lifting chamber of the cylinder and the spring tension forces the piston rod to move upward and retract, thus returning the percussion power tool back to the working surface.

In another embodiment, the actuating cylinder is a double acting cylinder which has a lifting and retracting chamber. Preferably, the control valve is a four-way directional control valve. When the valve is actuated, pressurized actuating media is directed to the lifting chamber, the piston with the piston rod moves downward against the working surface, thus generating an upward force to raise and free the percussion power tool. During the lifting process, the pressurized actuating media in the retracting chamber is released. When pressurized actuating media is directed to the retracting chamber, the piston rod moves upward and retracts, and the percussion power tool returns to the working surface. During the retracting process, the pressurized actuating media in the lifting chamber is released through an exhaust port on the directional control valve.

In yet another embodiment, the control unit further contains a pressure regulator to control the pressure difference between the lifting and retracting chambers, and thus to adjust the lifting height and the speed of the lift operation under the combined weight of the percussion power tool and the lift assist device. As such, the lift assist device of the present invention can be used with a variety of percussion power tool of different heights and configurations. Preferably, the pressure regulator is used to control the maximum pressure of the lifting chamber.

In yet another embodiment, the control unit contains a flow control valve in the place of a pressure regulator. The flow control valve is used to regulate the extension speed of the piston rod and thus the lifting speed for the percussion power tool. The flow control valve can also be used to regulate the retracting speed. Optionally, the control unit may contain two flow control valves so that the lifting and retracting speeds can be manipulated independently.

In yet another embodiment, the control unit further contains a pressure regulator and a flow control. As such, both the speed and the lifting height can be regulated as discussed hereinabove.

BRIEF DESCRIPTION OF THE DRAWINGS

FIG. 3 is a sectional representation of a single acting cylinder with a spring for use in the lift assist device to facilitate lifting and freeing the percussion power tool.

FIG. 4 is a sectional representation of a double acting cylinder for use in the lift assist device to facilitate lifting and freeing the percussion power tool.

FIG. 5 is an expanded sectional view of an actuating cylinder.

FIGS. 6A, 6B, and 6C are a schematic view, a top view, and a side view of a prior art three-way directional control valve with two positions, respectively.

FIG. 13 is a side elevation view of the bottom cylinder of the integrated lift assist device of FIG. 9.

FIG. 14 is an exploded view of the piston assembly with the piston rod and the lifting foot.

FIG. 15 is a sectional view of a mounting bracket.

DETAILED DESCRIPTION OF THE INVENTION

Figure 2A:
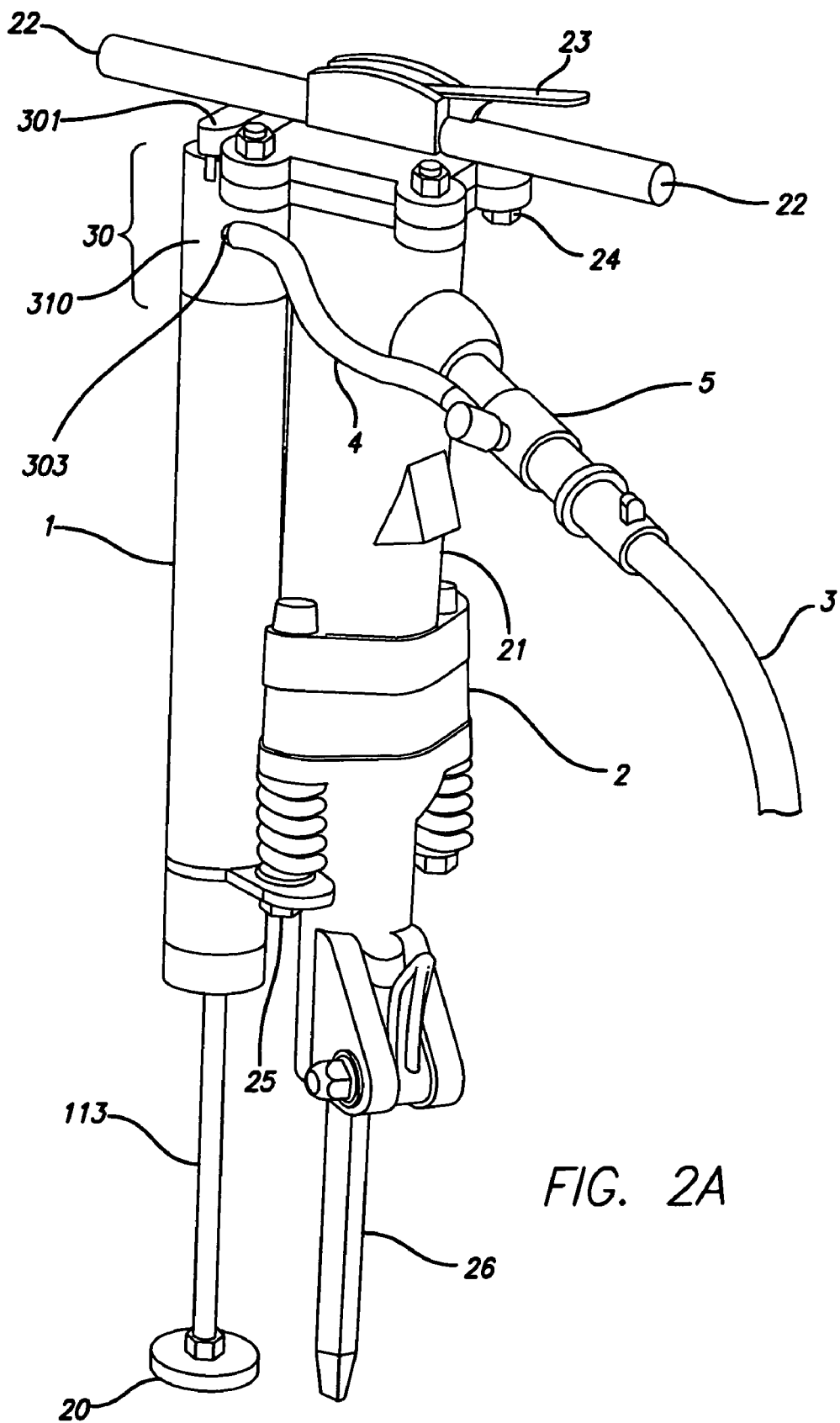
FIGS. 2A and 2B are a perspective and top view of an assembly of an integrated lift assist device and a conventional jackhammer, respectively.

The present invention relates to a lift assist device 1 which is used to alleviate the physical demands for the operation of a heavy percussion power tool 2 by facilitating the lifting and the extracting of the percussion power tool 2 (FIG. 2A). The lift assist device 1 can be used with a variety of percussion power tools, such as a jackhammer and rock drill. A percussion power tool 2 is commonly powered by compressed air. It can also be powered by hydraulic or electrical powers. A percussion power tool 2 is normally used for breaking up rock, concrete, road pavement such as asphalt and macadam, and earth. Commercial percussion power tools are supplied in a variety of weights and heights to suit particular applications. For example, American Pneumatic Tools, Inc. (Gardena, Calif.) provides several series of pneumatic tools, including Airgo-line paving breakers (e.g., Model 140A, 160A, and 190A), paving breakers (e.g., Model 117, 140 160, and 190), rock drills (e.g., Model 109, 115, 137, and 155). However, the lift assist device 1 of the present invention is not limited to any particular manufacture and any particular model, and can be readily attached to any percussion power tool using the mounting elements as provided or customarily designed to fit to a particular structure. In general, the main body of a percussion power tool 2 is a vertical cylinder 21 with handles 22 and throttle control 23 cross the top, and a working tool 26 such as a chisel extended out from the bottom. Pressurized actuating media, such as compressed air, is normally fed in through a flexible hose 3 from a compressor to the upper body of the cylinder 21, below the handle 22, to produce percussion forces.

Figure 1:
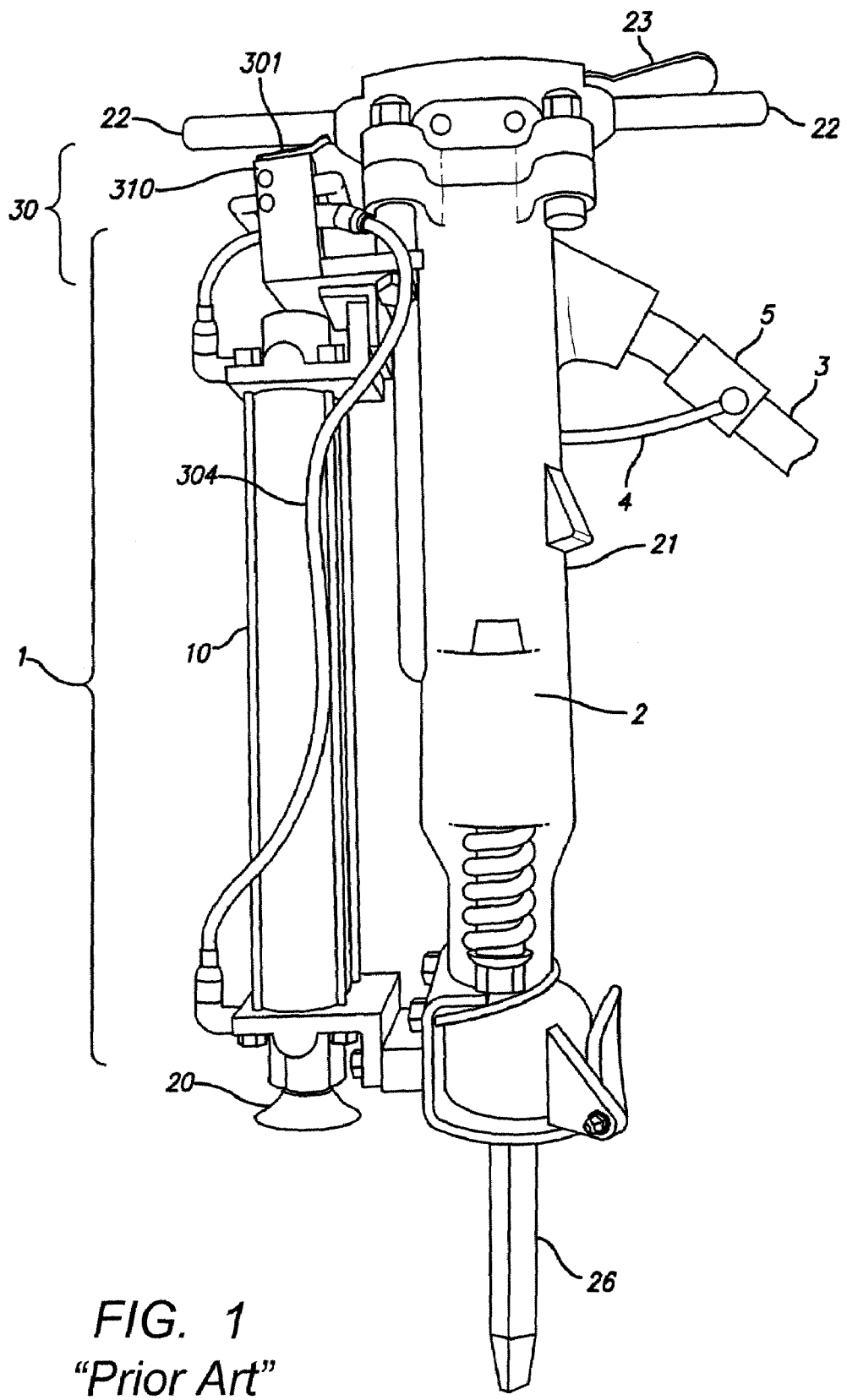
FIG. 1 is a perspective view of an assembly of a prior art lift assist device and a conventional jackhammer.
Figure 2B:
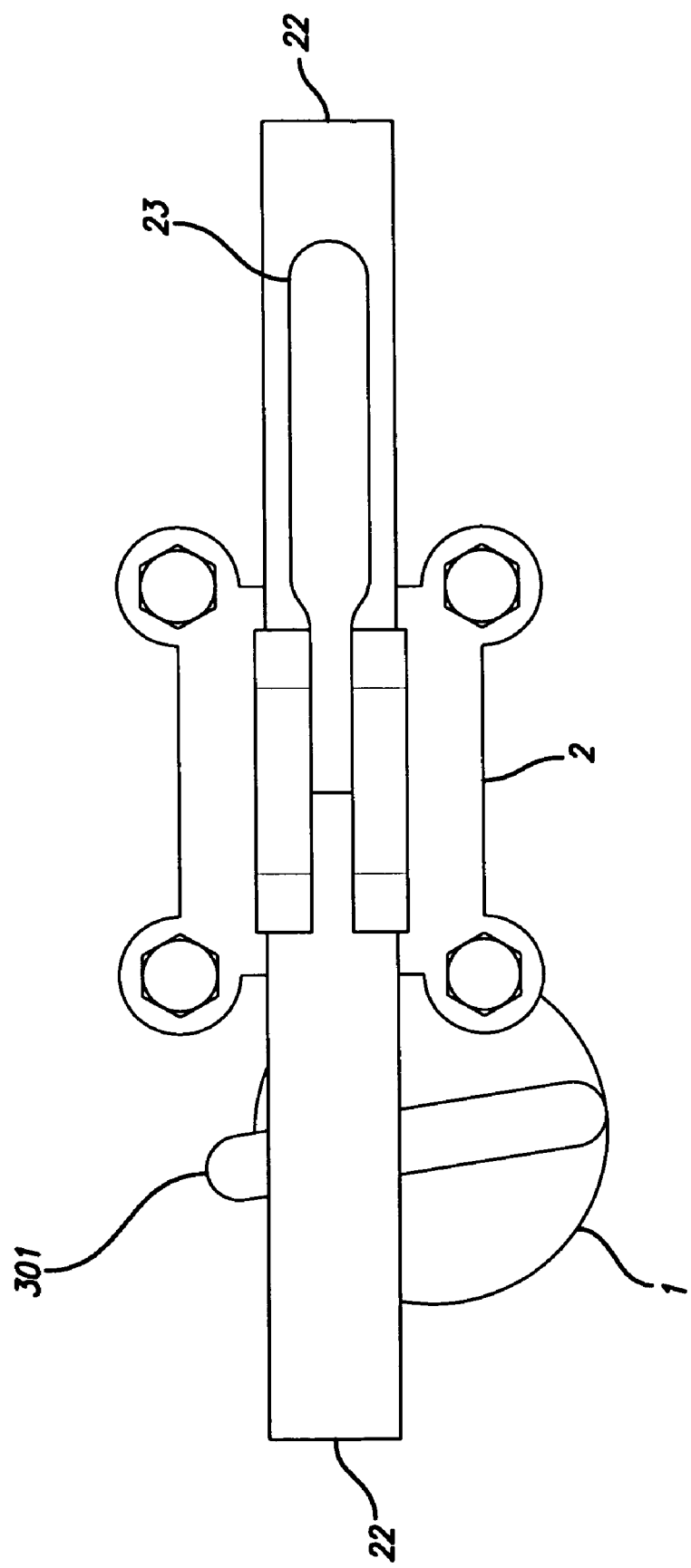

The lift assist device 1 of the present invention contains an actuating cylinder 10 with a lifting foot 20 and a control unit 30 which contains a directional control valve 310 and a hand control lever 301 (FIGS. 1 and 2). The actuating cylinder 10 converts actuating media power into a linear force and moves the foot 20 up and down. Typically, the cylinder 10 has a top, a bottom, and a cylinder wall between the top and bottom. The cylinder 10 also has a ram or piston 112 with a top and bottom, operating within a cylindrical bore 114 (FIGS. 3 and 4). As used herein, the terms "ram" and "piston" are interchangeable without distinguishing. Furthermore, the cylinder 10 contains a piston rod 113 with a top and bottom end. The top end of the piston rod 113 is mounted to the piston whereas the bottom end is optionally connected to the lifting foot 20 and secured with a pin or a set screw. The lifting foot 20 can also be screwed securely onto the piston rod 113 having a threaded end. The lifting foot 20 can be in various forms and shapes, including, but not limited to, bars, dishes, cylinders, and wheels.

A variety of actuating cylinders can be used in the present invention, including single acting and double acting cylinders. Various bore and stroke lengths of actuating cylinders can be employed in the lift assisting device of the present invention. Also, various types of piston mounting members can be used to enhance the performance and prolong the life. For example, an adjustable cushion 130 can be provided to facilitate smooth stopping of the piston movement (FIG. 5).

The lift assist device 1 can be operated under a wide range of pressure, from about 50 to 200 psi. A typical operating pressure is from about 70 to about 120 psi, most commonly about 90 psi. Normally, the lift assist device 1 should be operable in a temperature range of from about −40 to about 70° C. The cylinder 10 can be made from a variety of materials, including metals and alloys (e.g., steel, aluminum, and titanium), polymers such as PVC, and various composite materials such as fiber glass. Preferably, the lift assist device 1 can have a weight of no greater than about 20 pounds, no greater than about 15 pounds, no greater than about 10 pounds, or no greater than about 9 pounds. The cylinder 10 can have an inside diameter of from about 0.2 to about 10 inches or from about 0.5 to about 5 inches with the preferred diameter of from about 2.0 to about 2.75 inches. The cylinder 10 also has an outside diameter of from about 0.5 to about 10 inches or from about 0.75 to about 5 inches with the preferred diameter of from about 2.25 to about 3 inches. Furthermore, the cylinder 10 has a length of from about 2 to about 30 inches or from about 5 to about 25 inches with the preferred length of from about 18 to about 20 inches. The stroke of the cylinder 10 has a length of from about 1 to about 25 inches or from about 3 to about 20 inches with the preferred length of from about 16 to about 18 inches.

In one embodiment, the actuating cylinder 10 of the lift assist device 1 is a single acting cylinder 110 which contains a retracting device such as a bias spring 111, a piston 112, and a piston rod 113, all disposed within a longitudinal bore 114 (FIG. 3). The body of the cylinder 110 also contains two ports: an actuating media port 115 and an air port 116. Preferably, the spring 111 is a compression spring and located on the same side as where the piston rod 113 is located (FIG. 3). In an alternative embodiment, the spring 111 is a tension spring and located on the other side of the piston 112. The cylindrical bore 114 is thus naturally divided by the piston 112 into two chambers, a lifting chamber 40 and a retracting chamber 42 where the spring 111 is located. The actuating media port 115 is located on the lifting chamber 40, which is on the opposite side of the spring 111, whereas the air port 116 is located on the retracting chamber 42. The single acting cylinder 110 uses actuating media pressure to provide the force in down direction to extend the piston rod 113 and the tension of the spring 111 in up direction to retract the piston rod 113.

A three-way directional control valve 311 is normally used to control the operation of the single acting cylinder 110. To extend the piston rod 113, pressurized actuating media, such as compressed air, is directed through the actuating media port 115 into the lifting chamber 40 of the cylinder 110. The pressure acts on the top surface of the piston 112, pushing the piston 112 down with the piston rod 113 and the lifting foot 20 against the working surface to raise the assembly of the lift assist device 1 and the percussion power tool 2. During the lifting process, the spring 111 is compressed between bottom side of the piston 112 and the bottom wall 99 of the cylinder 110. To retract the piston rod 113, the directional control valve 311 is switched to the off position, releasing the pressure in the lifting chamber 40 of the cylinder 110. The spring tension forces the piston 112 to move upward, thus retracting the piston rod 113. The actuating media is free to flow from the lifting chamber 40 through the actuating media port 115, back through the control valve 311 to the return line in hydraulic systems or to the atmosphere in pneumatic systems. Typically, the air port 116 of the cylinder 110 is vented to the atmosphere for exhausting air from the retracting chamber 42 when the piston moves down and for intaking air into the retracting chamber 42 when the piston 112 moves up.

An example of the three-way directional control valve 311 is illustrated in FIG. 6. This directional control valve 311 has three ports (i.e., inlet port 313, outlet port 314, and exhaust port 315) and two positions (i.e., normal and actuated positions). The inlet port 313 is connected via the line 4 and the Tee coupling 5 to the main supply line 3 to the source of pressurized actuating media. The outlet port 314 is connected to the actuating media port 115 on the lifting chamber 40 of the cylinder 110 whereas the exhaust port 315 is optionally connected to the air port 116 on the retracting chamber 42. When the valve 311 is in actuated position, the inlet port 313 and outlet port 314 is connected and thus the pressurized actuating media from the supply line 3 flows into the lifting chamber 40 to push the piston 112 down with the piston rod 113 and foot 20 against the working surface to raise the assembly of the lift assist device 1 and the percussion power tool 2. When the valve 311 is in normal position, the inlet port 313 is blocked, the outlet port 314 is connected to the exhaust port 315, thus the pressurized actuating media is released from the lifting chamber 40 and the spring tension forces the piston 112 to move upward to retract the piston rod 113.

In another embodiment, the actuating cylinder 10 of the lift assist device 1 is a double acting cylinder 120 in which pressurized actuating media can be applied to either side of the piston 112 to apply force and provide movement (FIG. 4). Typically, the cylinder 120 contains one piston 112 and one piston rod 113, both disposed within a longitudinal bore 114. The stroke of the piston 112 and piston rod 113 in either direction is produced by actuating media pressure. The cylinder 120 also contains two actuating media ports (121 and 122), one near each end of the cylinder, alternate as inlet port and outlet port, depending on the direction of flow as controlled by the directional control valve 310. When an unbalanced actuating cylinder 120, which has two different effective working areas on the two sides of the piston 112, is used, the cylinder 120 is normally installed so that the blank side of the piston 120, which carries the greater load during the piston rod 113 extension stroke, is used for lifting. The cylindrical bore 114 is also divided by the piston 112 into two chambers with the lifting chamber 41 on top and the retracting chamber 43 on bottom.

A four-way directional control valve 312 with five ports is normally used to control the operation of the double acting cylinder 120. The valve 312 can be positioned to direct pressurized actuating media to either end of the cylinder 120 and allow the displaced actuating media to flow from the opposite end of the cylinder 120 through the control valve 312 to the return line in hydraulic systems or to the atmosphere in pneumatic systems. When pressured actuating media is admitted into the lifting chamber 41, the piston 112 moves down and extends the piston rod 113 with the lifting foot 20 to lift the percussion power tool 2 off the working surface. When pressured actuating media is admitted into the retracting chamber 43, the foot 20 is retracted and the percussion power tool 2 returns to the working surface.

Figure 7A:
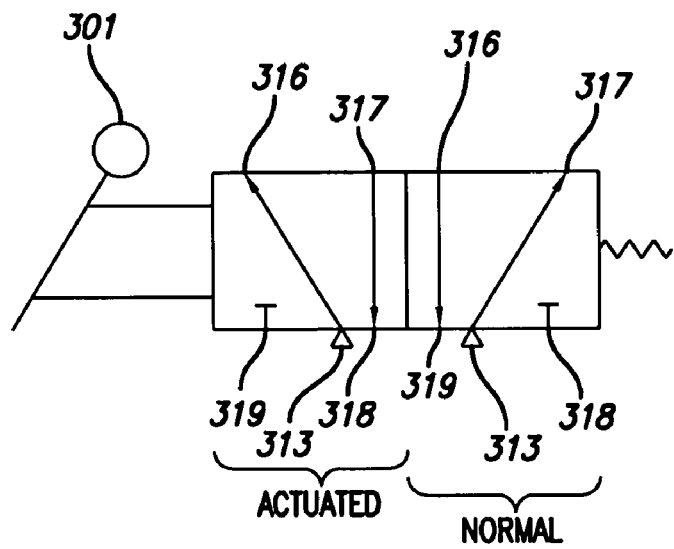
FIGS. 7A and 7B are a schematic representation and a perspective view of a prior art four-way directional control valve with two positions, respectively.
Figure 7B:
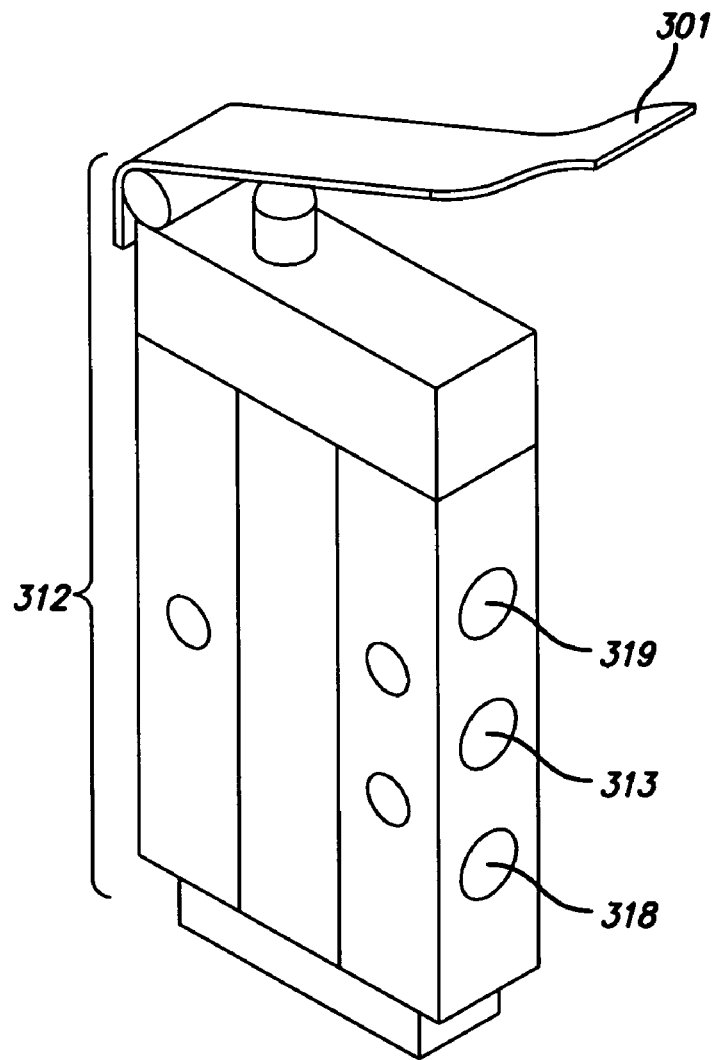

An example of the four-way directional control valve 312 is illustrated in FIG. 7. This directional control valve 312 has five ports (i.e., inlet port 313, outlet ports 316 and 317, and exhaust ports 318 and 319) and two positions (i.e., normal and actuated positions). The inlet port 313 is connected via the line 4 and the Tee coupling 5 to the main supply line 3. The outlet ports 316 and 317 are connected to the actuating media ports 121 and 122, respectively. When the valve 312 is in actuated position, the inlet port 313 is connected to the outlet port 316 and thus the pressurized actuating media from the supply line 3 flows into the lifting chamber 41 to push the piston 112 down with the piston rod 113 and foot 20 against the working surface to raise the assembly of the lift assist device 1 and the percussion power tool 2. At this actuated position, the outlet port 317 is also connected to the exhaust port 318 to release the pressurized actuating media from the retracting chamber 43. When the valve 312 is in normal position, the inlet port 313 is connected to the outlet port 317 and thus the pressurized actuating media flows into the retracting chamber 43 to withdraw the lifting foot 20. At the same time, the outlet port 316 is connected to the exhaust port 319 to release the pressurized actuating media in the lifting chamber 41.

Figure 8A:
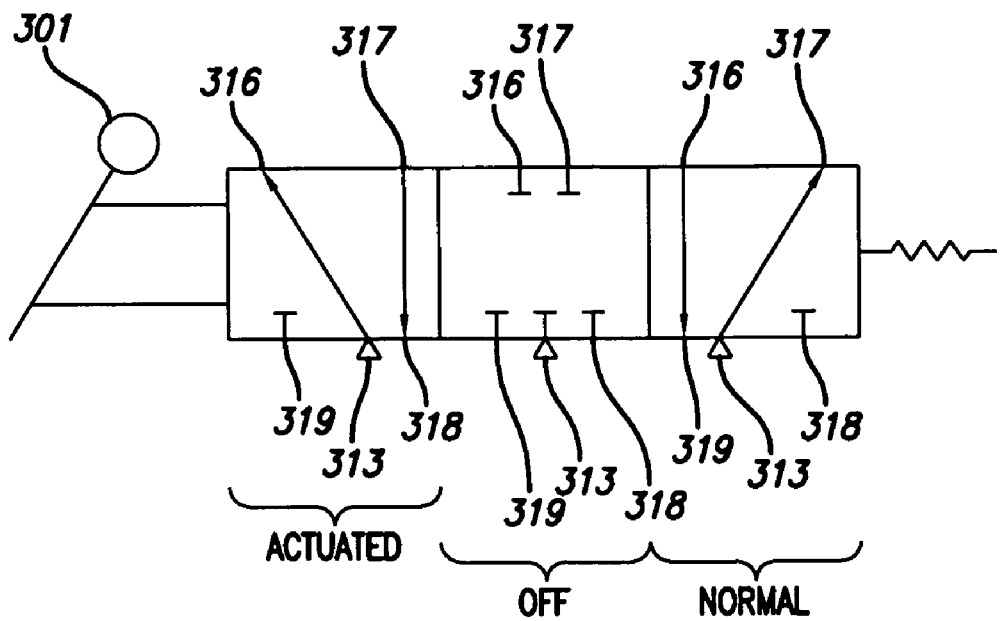
FIGS. 8A and 8B are a schematic representation of a perspective and sectional view of a prior art four-way directional control valve with three positions, respectively.
Figure 8B:
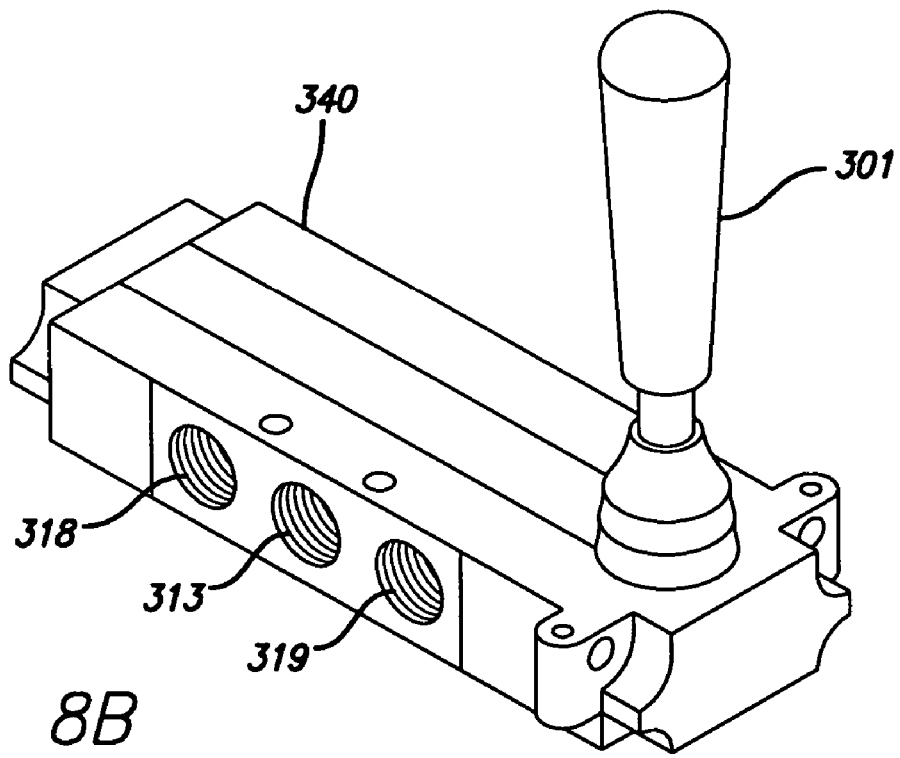

In yet another embodiment, the directional control valve 310 has three positions, an active right position for lifting, a middle off position, and an active left position for retracting. An example of a four-way, three-position, directional valve 340 is illustrated in FIG. 8. The actuated position is for admission of pressurized actuating media to the lifting chamber (40 or 41) whereas the normal position is for the release of actuating media from the lifting chamber (40 or 41). The middle off position maintains the pressure of the lifting chamber (40 or 41) equal to the pressure of the retracting chamber (42 or 43). At this position, no actuating media gets in or out of the cylinder 10, and the assembly of the lift assist device 1 and the percussion power tool 2 can be readily transported when the lifting foot 20 is a wheel and the like.

In yet another embodiment, the lift assist device 1 further contains a pressure regulator (not shown) for manipulation of the traveling distance (extension) of the piston rod 113, thus the lifting height under the combined weight of the lift assist device 1 and the percussion power tool 2. As used herein, the term "pressure regulator" also includes a pressure reducing valve which provides a steady pressure at a lower pressure than the supply system. Preferably, the pressure regulator is used to regulate the maximum pressure of the lifting chamber (40 or 41). The pressure regulator can be located between the actuating media port (115 or 121) of the lifting chamber (40 or 41) and the directional control valve 310, or before the directional control valve 310. When the cylinder 10 is a double acting cylinder 120, the pressure regulator is preferably located before the directional control valve 310 so that the pressures of both chambers 41 and 43 can be regulated. In operation, the pressure can be adjusted to such level that a desired lifting height is reached for a particular application under the combined weight of the lift assist device 1 and the percussion power tool 2. The lifting height is determined by the combined weight and the difference in pressure between the two chambers, for example, the lifting chamber 41 and the retracting chamber 43 for a double acting cylinder 120. The greater the difference in pressure, the longer the foot moves.

In yet another embodiment, the control unit 30 contains a flow control valve (not shown) in the place of a pressure regulator. The flow control valve is used to regulate the extension speed of the piston rod 113 and thus the lifting speed for the assembly of the lift assist device 1 and the percussion power tool 2. The flow control valve can be arranged either before the directional control valve 310 or after. When the flow control valve is located prior to the directional control valve 310, the lifting and retracting speeds can be adjusted for a double acting cylinder 120. When the flow control valve is located after the directional control valve 310, only the lifting speed is adjustable. In this case, an optional flow control valve can be added to regulate the retracting speed independently for a double acting cylinder 120.

In yet another embodiment, the control unit further contains a pressure regulator and a flow control. As such, both the speed and the lifting height can be regulated as discussed hereinabove.

Figure 9:
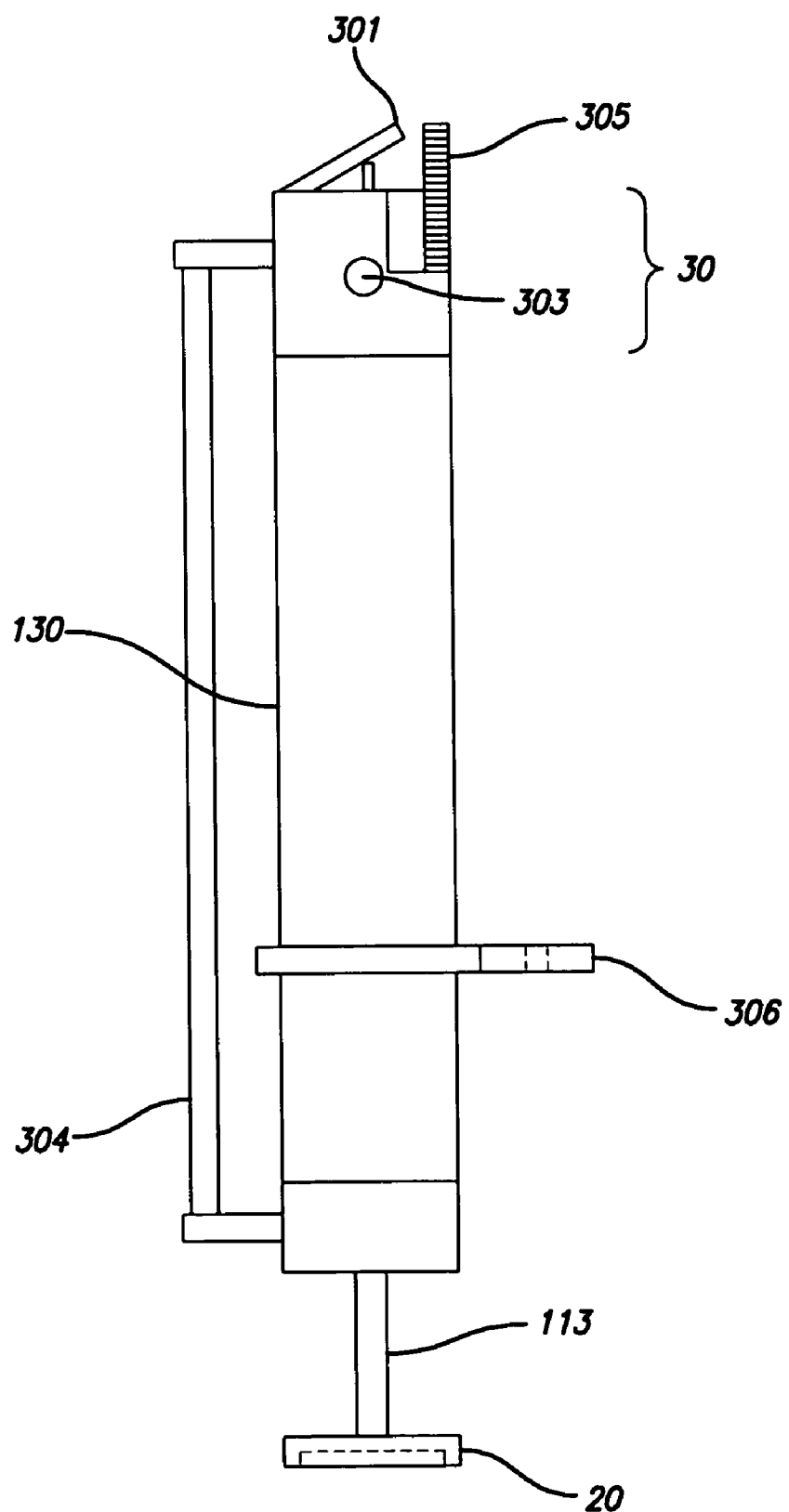
FIG. 9 is a side-elevation view of the integrated lift assist device of FIGS. 2A and 2B, wherein the control valve is integrated into the lift assist device.

In certain embodiments, the lift assist device 1 of the present invention is provided as a single device in which the control unit 30 with a hand control lever 301 and the actuating cylinder 10 with a lifting foot 20 are integrated as shown in FIG. 9. The integrated device 130 also contains a single actuating media port 303, an actuating media transporting line 304 for a double acting cylinder 120 or an optional air exhausting line for a single acting cylinder 110, and two mounting elements (305 and 306). The mounting elements can be in various forms, such as brackets and stubs. Preferably, the mounting elements are those structures which fully take the advantage of the existing structural elements of the percussion power tool 2, such as bolts, nuts, screws, and likes. For example, the top mounting element 305 is a mounting stud and the bottom mounting element 306 is a mounting bracket. The lift assist device 1 draws actuating media directly from the pressured actuating media line 3 via line 4, which is regulated by the control unit 30. In addition to the directional control valve 310, the control unit 30 may also have a pressure regulator, a flow control valve, or the combination thereof. The hand control lever 301 for the directional control valve 310 can be a push handle lever or pull trigger. The integrated device 130 can be readily mounted to a conventional percussion power tool 2, preferably using the existing structural components of the percussion power tool 2. For example, the lift assist device 1 is secured to the top of the percussion power tool 2 using the mounting stud 305 to replace one existing bolt 24 of the percussion power tool 2. The bottom of the integrated device 130 is mounted to the bottom of the spring 25 on the body of the percussion power tool 2 using the mounting bracket 306 provided.

Other suitable methods can also be used to secure the integrated lift assist device 130 to the percussion power tool 2. For example, the integrated lift assist device 130 can be attached parallel to the body of the percussion power tool 2 with a suitable mounting element so that the vertical mounting position relative to the percussion power tool 2 can be adjusted. The mounting elements can also have a quick release mechanism for attachment and release of the lift assist device 1.

Figure 10:
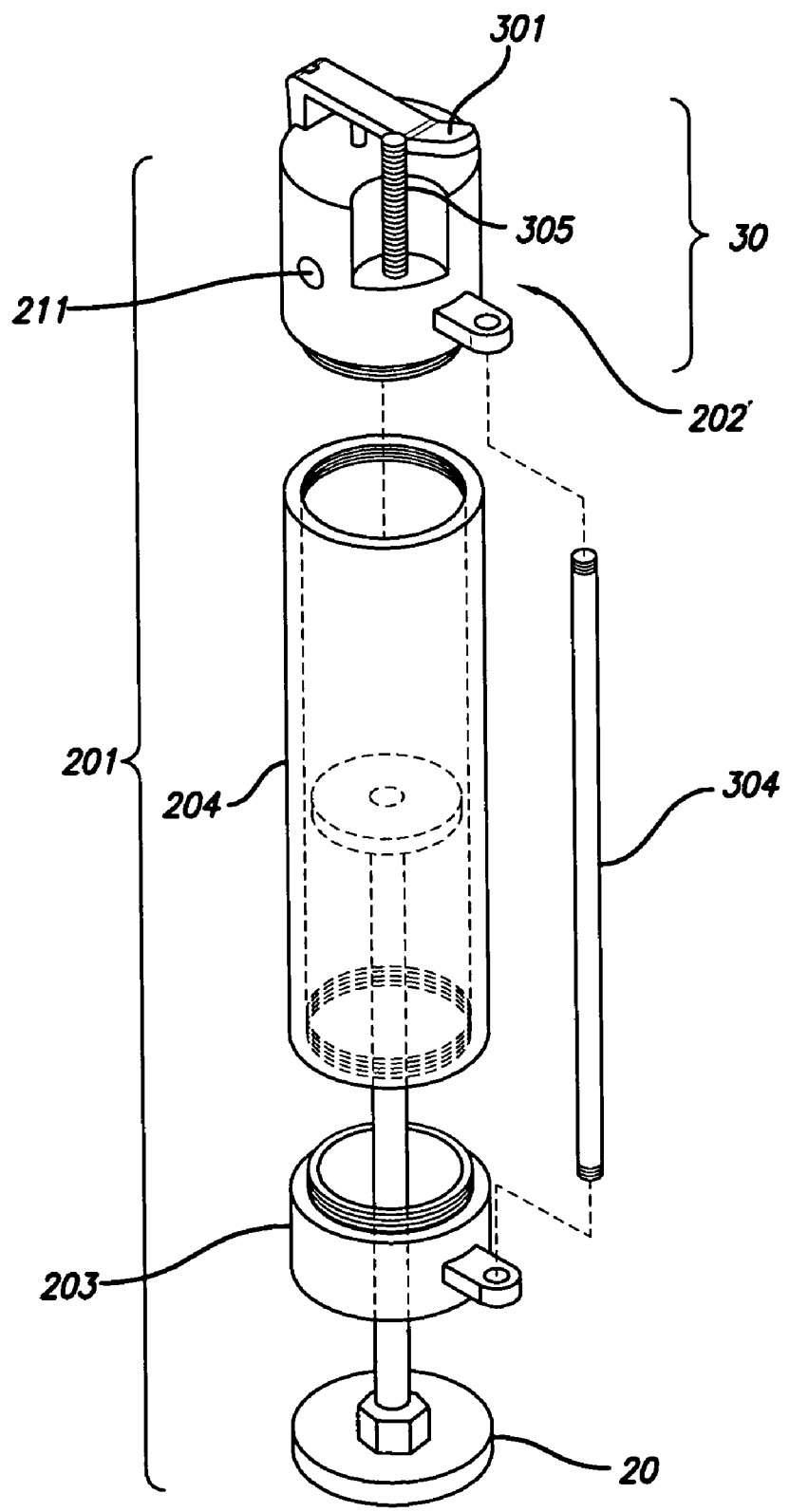
FIG. 10 an exploded view of the integrated lift assist device of FIG. 9.

In an exemplary embodiment, the integrated lift assist device 1 has a vertical cylindrical body 201 with a lifting foot 20 on the bottom and a hand control lever 301 on the top (FIGS. 9 and 10). The vertical cylindrical body 201 has a top cylinder 202, a bottom cylinder 203, and a cylinder wall 204 with threaded top and bottom ends (FIG. 10). The cylinder wall 204 serves as the wall for the actuating cylinder 10 of the lift assist device 1. The top cylinder 202 has a threaded bottom end which is securely mounted to the top end of the cylinder wall 204 and serves as the top wall of the actuating cylinder 10. Additionally, the top cylinder 202 includes a control unit 30 which contains a directional control valve 310, an inlet port 211 optionally two exhaust port 212 and 213 on the side wall, and a mounting stud 305 on the upper body. The top cylinder 202 also has a first outlet port 214 on the bottom of the top cylinder 202 and a second outlet port 215 on the side wall. The first outlet port 214 also serves as the actuating media port (115 or 121) of the actuating cylinder 10 for transporting actuating media in and out of the lifting chamber (40 or 41). The second outlet port 215 may be connected to the retracting chamber (42 and 43) through a media transporting line 304.

Figures 11A, 11B:
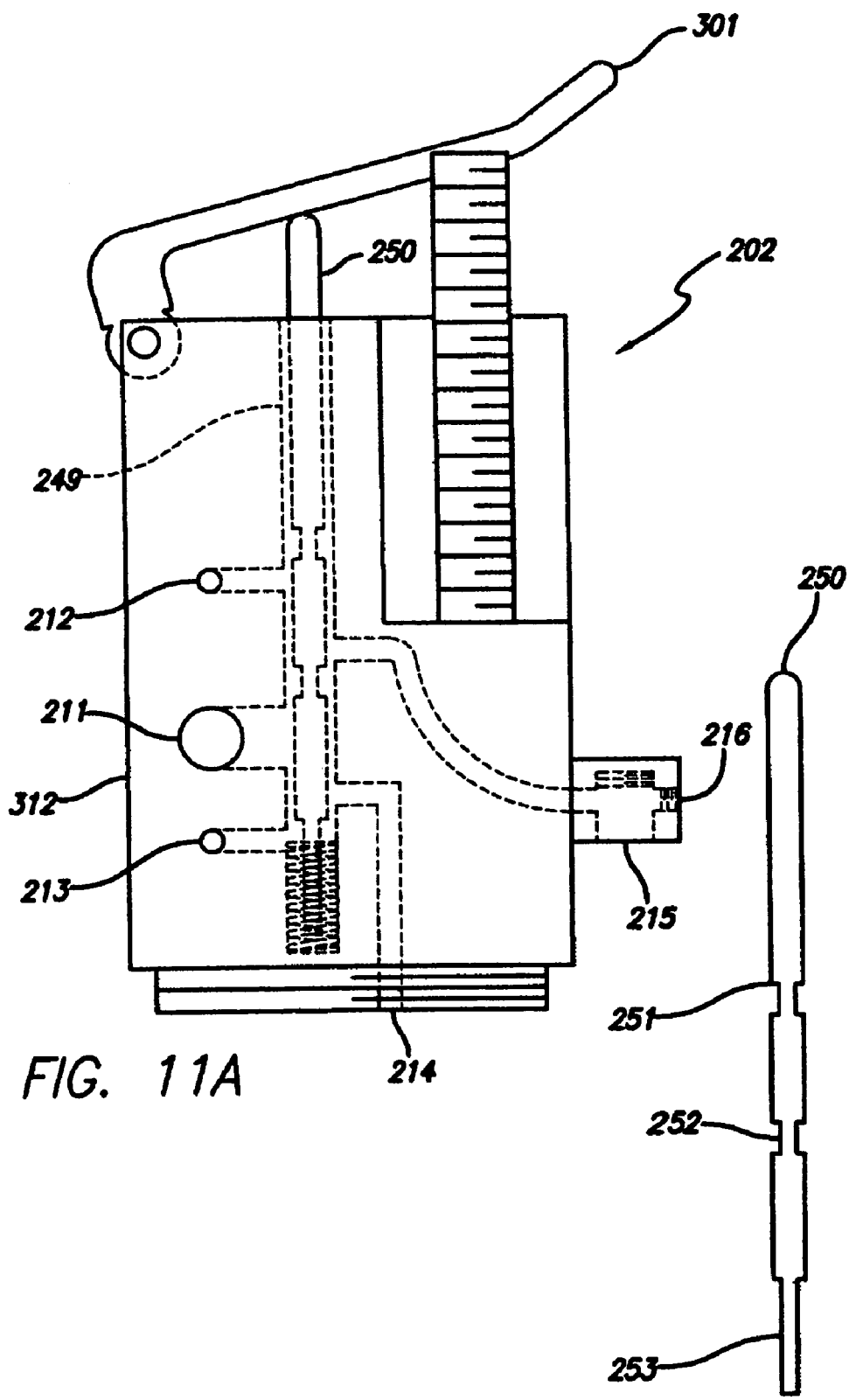
FIG. 11A is a side elevation view of the top cylinder of the integrated lift assist device, with dashed lines showing the integrated control valve inside the top cylinder.
FIG. 11B is an enlarged side elevation view of the control stem of the integrated control valve of the top cylinder of FIG. 11A.

Preferably, the directional control valve 310 is a stem actuated valve which can be a three-way 311 or four-way directional valve 312. An example of a four-way directional valve 312 with two positions is shown in FIGS. 11A and 11B. The four-way directional valve 312 has an elongated valve stem 250 which has three portions with a reduced diameter, 251, 252 and 253. The majority of the valve stem 250 is inside the vertical cylindrical bore 249. The top end of the valve stem 250 is extended upwards to engage with the hand control lever 301 for manipulating the operation of the directional valve 312. For a double acting cylinder 120, the upper portion 251 is used to control the flow of actuating media for the retracting chamber 43 where the middle portion 252 is used to control flow of the actuating media for the lifting chamber 41. When the directional valve 310 is actuated, the flow of pressurized actuating media is directed to the lifting chamber 41. The actuating media flows from the inlet port 211 to the outlet port 214 through the space between the middle portion 252 and the wall of the cylindrical bore 249. At the same time, the outlet port 215 is connected with the exhaust port 212 through the space between the upper portion 251 and the wall of the cylindrical bore 249 for releasing the pressure in the retracting chamber 43. When the directional valve 310 is in normal position (unactuated), the flow of pressurized actuating media is directed to the retracting chamber 43 for a double acting cylinder 120. The actuating media flows from the inlet port 211 to the outlet port 215 through the space between the upper portion 251 and the wall of the cylindrical bore 249. At the same time, the outlet port 214 is connected with the exhaust port 213 through the space between the middle portion 252 and the wall of the cylindrical bore 249 for releasing the pressure in the lifting chamber 41. The directional control valve 312 also contains a compression spring 257 on the lower portion 256 for assisting the return of directional valve 312 to the normal position.

Figure 12A:
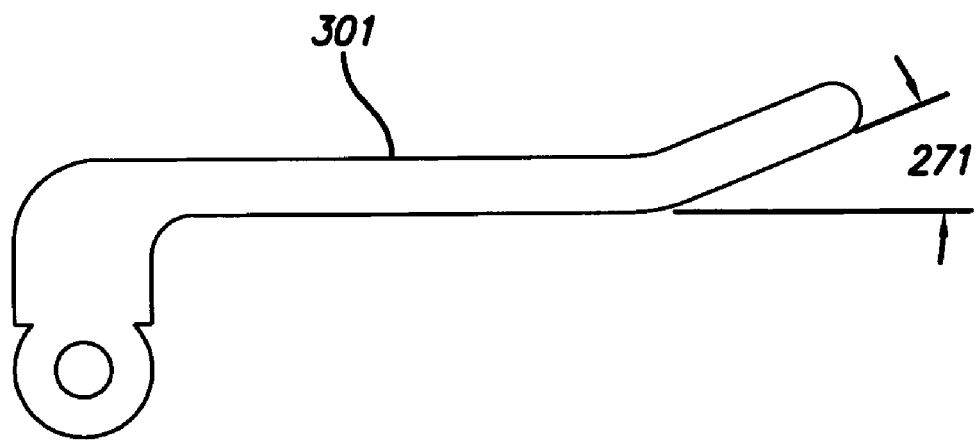
FIGS. 12A and 12B are a top and side view of the hand control lever of the integrated control valve of the top cylinder of FIG. 11A, respectively.
Figure 12B:
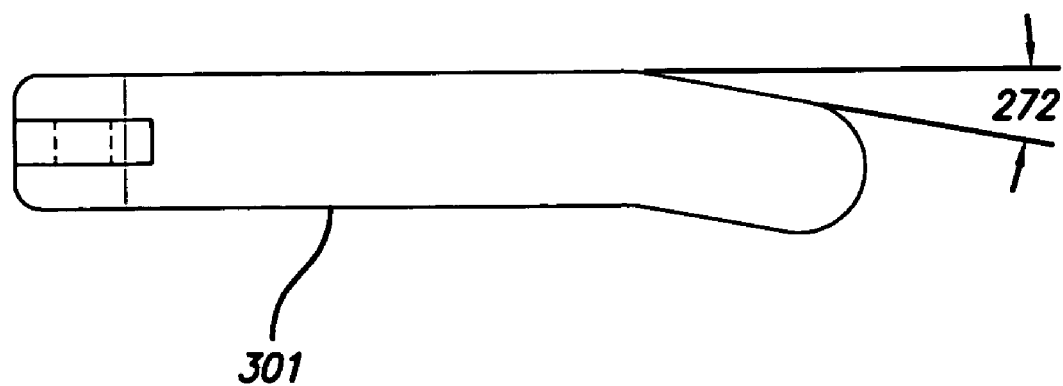

A non-limiting example of the hand lever 301 is shown in FIG. 12. The hand control lever 301 has a vertical angle 271 and a horizontal angle 272 for convenient installation and operation. The selection of particular horizontal and vertical angles depends on a particular percussion power tool 2. The handle of the hand control lever 301 can be bent eight degrees upwards or downwards. Preferably, the vertical angle 271 is no greater than 40 degrees, no greater than 30 degrees, no greater than 20 degrees, no greater than 15 degrees, or no greater than 10 degrees. The horizontal angle 310 can also be formed in either longitudinal side of the hand lever. The horizontal angle 272 is no greater than 30 degrees, no greater than 20 degrees, no greater than 15 degrees, no greater than 10 degrees, or no greater than 5 degree.

The bottom cylinder 203 has a threaded top end which is securely mounted to the bottom end of the cylinder wall 204 (FIG. 13). The bottom cylinder 203 also contains a port 218, which functions as an air port 116 for a single acting cylinder 110 or an actuating media port 122 for a double acting cylinder 120, and a vertical hole 230 in the center, through which the piston rod 113 is extended out from the actuating cylinder 10. For a double acting cylinder 120, the port 218 serves as the actuating media port 122 and is connected to the outlet port 215 through the transporting line 304. The transporting line 304 has two threaded ends and can be screwed onto the threaded port 215 and 218. The transporting line 217 can be further secured to the ports 215 and 218 with set screws 216 and 219.

The piston rod 113 of the actuating cylinder 10 has two threaded ends ((FIG. 14). The bottom outside end is connected with a lifting foot 20 whereas the top inside end is connected to the piston 112, which includes two plunger cups, 241 and 242, and a plunger cup spacer 240, with two screws 245 and 246. The actuating cylinder may also include other commonly used parts for enhancing performance and elongating life.

The upper mounting element 305 is a mounting stud which is on the top of the top cylinder 202. The lower mounting element 306 is a mounting bracket as shown in FIG. 15. The lower mounting bracket has two holes, 331 and 332. The diameter of the first hole 331 is slightly larger than the outside diameter of the vertical cylindrical body 201, which enables the mounting bracket 306 to slide up and down along the cylindrical body 201. The second hole 332 with a smaller diameter is attached to the body of the percussion power tool 2. For example, the second hole 332 is attached to one of the lower springs 25 of the percussion power tool 2 (FIG. 2A).

In certain embodiments, the lift assist device 1 of the present invention can also be provided as a kit which typically includes an actuating cylinder 10 with a lifting foot 20, a control unit 30 with a handle control lever 23 mounted onto the top mounting bracket 305, a bottom mounting bracket 306, three actuating media transporting lines, and a Tee coupling 5. The control unit 30 also contains three ports. The first port 303 is used to draw pressured actuating media directly from the pressured actuating media line 3 via line 4 and the Tee coupling 5, and regulated by the control unit 30. The second port is connected to the actuating media port (115 or 121) on the lifting chamber using an actuating media transporting line. The third port is connected to the actuating media port 122 for a double acting cylinder or optionally to the air port 116 for a single acting cylinder, using the actuating media transporting line 304. Similarly, the hand control lever 301 for the directional control valve 310 can be a push handle lever or a pull trigger. Prior to attachment to the percussion power tool 2, the two actuating media transporting lines, the control unit 30, the cylinder 10, and the top mounting bracket are first assembled together. The top of this assembly is then mounted to the top of the percussion power tool 2 using the existing nuts or bolts. The bottom of this assembly is further secured to the lower body of the percussion power tool 2 using the bottom mounting bracket 306.

An example of the integrated lift assist device 130 is illustrated in FIG. 2, which had a cylindrical body with a foot 20 attached to the bottom of a piston rod 113 and a control unit 30 on the top end of the cylinder. The device 130 had a length of about 23 inches and a weight of 9 pounds. The actuating cylinder 10 had a length of 18 inches, a stroke of about 14 inches, an outside diameter of about 2.5 inches, and an inside diameter of about 2.25 inches. The lift assist device 130 had a lifting force of 315 pounds. The cylinder 10 was constructed with aluminum to reduce the weight and the piston rod 113 was a steel hardened shaft. The control unit 30 had a push handle lever 301 and a four-way directional control valve 310 hard-piped to an actuating media port 303. On the bottom end, the lift assist device 130 was mounted to the bottom of the spring 25 on the lower body of a jackhammer 2 with a bottom mounting bracket 306. The lift assist device 130 was secured to the top of the jackhammer 2 using the mounting stud 305 to replace one existing bolt 24 of the jackhammer 2.

Another example of the integrated lift assist device 130 also has a cylindrical body with a foot 20 attached to the bottom of a piston rod 113 and a control unit 30 on the top of the cylinder. The device 130 has a length of about 25 inches and a weight of 9 pounds. The cylinder 10 has a length of 20 inches, a stroke of about 16 inches, an outside diameter of about 2.75 inches, and an inside diameter of about 2.5 inches. The lift assist device 130 has a lifting force of 355 pounds. The piston rod 113 is a precision ground steel hardened chrome-plated shaft. The cylinder 10 also includes a double seal at the bottom. The control unit 30 has a pull trigger, an adjustable air regulator 330 to control the extension speed, and a directional control valve 310 hard-piped to the actuating media port 303. The lift assist device 130 is mounted to the jackhammer 2 in the same way as described hereinabove.

One skilled in the art will understand that various modifications may be made to the above embodiments which are still within the scope and spirit of the invention described herein. For example, the same lift assist device can be attached to different tools by designing tool specific mounting structural elements. Therefore, the above description should not be construed as limiting but merely as exemplifications of the preferred embodiments of the invention.

What is claimed is:

1. A lift assist device for attachment to a percussion power tool to facilitate lifting and extraction of the percussion power tool, the lift assist device comprising:
   a) a top cylinder;
   b) a bottom cylinder;
   c) a cylinder wall connected to and between the top cylinder and the bottom cylinder, wherein the top cylinder and the bottom cylinder when connected to the cylinder wall form a continuous vertical cylindrical body with an upper lifting chamber and a lower retracting chamber;
   d) a control unit operably associated with the top cylinder, wherein the control unit further comprises a control valve operable by a lever, wherein the control valve has at least an actuated position and a normal position that control flow of actuating media through an inlet port and a first outlet port, wherein the inlet port is operably connected to a source of pressurized actuating media, and wherein the first outlet port is operably connected to the upper lifting chamber;
   e) a lifting foot unit vertically aligned with the cylindrical body, the lifting foot unit comprising a piston, a lifting foot and a piston rod connected to and between the lifting foot and the piston, wherein the piston rod extends through an opening in the bottom cylinder, and wherein the piston separates the upper lifting chamber from the lower retracting chamber; and
   a piston retractor arranged to provide a force against the piston and maintain the piston in an upward direction away from the bottom cylinder towards the top cylinder to thereby keep the lifting foot maintained in a retracted position when the control valve is in the normal position;
wherein actuation of the control valve, releases said force against the piston to push the piston down with the piston rod and lifting foot against the working surface to raise the percussion power tool from the working surface,
thereafter switching the control valve to the normal position to force the piston rod and lifting foot back to the upward and maintained retracted position, thus returning the percussion power tool to the working surface.

2. The lift assist device of claim 1, wherein when the control valve is in the actuated position pressurized actuating media flows from the inlet port of the control unit through the first outlet port of the control unit into the upper lifting chamber to force the piston in a downward direction thereby moving the lifting foot away from the cylindrical body.

3. The lift assist device of claim 1, wherein when the control valve is in the normal position the piston moves in an upward direction away from the bottom cylinder towards the top cylinder.

4. The lift assist device of claim 1, wherein when the control valve is in the normal position actuating media flows out of the upper lifting chamber through an exhaust port.

5. The lift assist device of claim 1, further comprising:
   a second outlet port operably connected by an actuating media line to an actuating media port in the lower retracting chamber;
   wherein the control valve controls flow of actuating media through the second outlet port;
   wherein when the control valve is in the normal position, pressurized actuating media flows from the inlet port of the control unit through the second outlet port of the control unit and through the actuating media line into the actuating media port in the lower retracting chamber.

6. The lift assist device of claim 5, wherein the retractor is pressurized actuating media in the lower retracting chamber.

7. The lift assist device of claim 1, further comprising an adjustable pressure regulator that controls the lifting height of the lift assist device.

8. The lift assist device of claim 7, wherein the lifting foot is extendable at variably extended positions.

9. The lift assist device of claim 1, further comprising an adjustable flow control valve that regulates the lifting speed of the lift assist device.

10. The lift assist device of claim 1, wherein the source of pressurized actuating media is operably connected to both the lift assist device and the percussion power tool.

11. The lift assist device of claim 1, further comprising an upper mounting element and a lower mounting element.

12. The lift assist device of claim 11, wherein the upper mounting element is a mounting stud connected to the top cylinder.

13. The lift assist device of claim 12, wherein the mounting stud replaces a bolt of the percussion power tool.

14. The lift assist device of claim 11, wherein the lower mounting element is a bracket having a first aperture sized to engage with a lower spring of the percussion power tool.

15. The lift assist device of claim 14, wherein the bracket has a second aperture sized to engage with the continuous vertical cylindrical body of the lift assist device.

16. The lift assist device of claim 1, wherein the cylinder wall is threadably engaged with the top cylinder and bottom cylinder.

17. The lift assist device of claim 1, wherein the lever is mounted on the top cylinder below and adjacent to a handle of the percussion power tool.

18. The lift assist device of claim 17, wherein the lever is a pull trigger.

* * * * *